United States Patent [19]

Mori et al.

[11] 4,232,086
[45] Nov. 4, 1980

[54] POLYOLEFIN-METAL BONDED STRUCTURES AND PROCESS FOR PREPARING SAME

[75] Inventors: Fumio Mori, Yokohama; Isao Ichinose, Hiratsuka; Go Kunimoto, Fujisawa, all of Japan

[73] Assignee: Toyo Seikan Kaisha, Ltd., Tokyo, Japan

[21] Appl. No.: 960,931

[22] Filed: Nov. 15, 1978

[30] Foreign Application Priority Data

Nov. 12, 1977 [JP] Japan .................................. 52137259

[51] Int. Cl.$^2$ ...................... B65D 41/12; B32B 31/06; B05D 1/36
[52] U.S. Cl. .................................... 428/341; 156/330; 156/334; 215/328; 427/375; 428/416; 428/461
[58] Field of Search ................ 156/536, 334; 215/328; 428/341, 416, 461; 427/375

[56] References Cited

U.S. PATENT DOCUMENTS

| | | | |
|---|---|---|---|
| Re. 30,006 | 5/1979 | Sakayori et al. ................. | 156/330 X |
| 3,233,770 | 2/1966 | Waters ..................................... | 215/40 |
| 3,361,281 | 1/1968 | Kehe ....................................... | 215/39 |
| 3,487,124 | 12/1969 | Yeshin .................................... | 260/831 |
| 3,581,690 | 6/1971 | Zapata .................................... | 113/80 |
| 3,633,781 | 1/1972 | Zapata .................................... | 215/39 |

*Primary Examiner*—James R. Hoffman
*Attorney, Agent, or Firm*—Pennie & Edmonds

[57] ABSTRACT

When a polyolefin layer is bonded to a metal substrate through a primer layer, if a polar group-containing ethylenically unsaturated monomer-modified olefin resin (A) having a specific polar group concentration and a specific degree of crystallinity and a coating film-forming base resin (B) are incorporated at a specific ratio into a specific mixed solvent to form a paint and the primer layer is formed by using this paint, there is obtained a novel multi-layer distribution structure comprising the base resin distributed predominantly in the portion of the primer layer contiguous to the surface of the metal substrate and the modified olefin resin distributed predominantly in the portion of the primer layer contiguous to the polyolefin layer and having a concentration gradient of the two components (A) and (B) in the thickness direction. By virtue of the presence of this primer layer, the bonding strength between the metal substrate and the polyolefin and the corrosion resistance of the metal substrate as well as the processability of the polyolefin-metal bonded structure are substantially improved.

17 Claims, No Drawings

POLYOLEFIN-METAL BONDED STRUCTURES AND PROCESS FOR PREPARING SAME

BACKGROUND OF THE INVENTION

This invention relates to polyolefin-metal bonded structures. More particularly, it relates to a novel polyolefin-metal bonded structure and methods for making same in which a polyolefin layer is bonded to a metal substrate through a primer layer comprising a combination of a polar group-containing, ethylenically unsaturated monomer-modified resin and a coating film-forming base resin. The primer layer has a novel multilayer structure in which both resins are distributed in concentration gradients in the thickness direction.

Sealing members for crown caps or other vessel closures have heretofore been made by coating a surface-protecting paint onto a metal sheet, molding the coated metal sheet into a crown shell, cap, or the like and bonding a packing material to the inner face of the molded cap or shell. Polyolefins such as polyethylene have excellent sanitary properties with respect to food containers and the like and a very high moisture resistance. Accordingly, they are preferred for use as packing materials for vessel closures. However, polyolefins have a serious defect in that their bondability to metal substrates is very poor.

Various undercoat paints or primers for improving the bondability between a polyolefin and a metal substrate have heretofore been proposed. An example of such a primer is a composition comprising a coating film-forming epoxy base resin having dispersed therein a polar group-containing ethylenically unsaturated monomer-modified olefin resin such as polypropylene or polyethylene modified with an ethylenically unsaturated carboxylic acid. This undercoat paint performs well to some extent compared to a similar paint free from a modified olefin resin with respect to its bondability to a polyolefin. However, such undercoat paints are insufficient to bond a polyolefin packing material to the inner face of a vessel closure securely enough that the packing is not peeled off. Furthermore, the use of an undercoat paint formed by incorporating such modified resin into a coating film-forming base resin suffers a serious drawback in that the corrosion resistance of the metal substrate is drastically reduced.

It is apparent from the foregoing, therefore, that primers heretofore used for bonding a polyolefin to a metal substrate leave much to be desired with respect to the combination of peel resistance and corrosion resistance.

Accordingly, it is an object of the present invention to provide a polyolefin-metal bonded structure having a desirable and stable combination of high adhesion and high corrosion resistance even under practical mass-production conditions and wherein the bonding strength and corrosion resistance can be maintained at the necessary high levels even under severe processing conditions such as pressing.

Another object of the invention is to provide a vessel closure such as a crown cap having a polyolefin packing and which exhibits excellent sanitary properties with respect to foods and other contents, high moisture and corrosion resistance, good cushioning of the mouth portion of the vessel, and high resistance to peeling of the packing from the closure.

Yet another object is to provide a process for producing the aforementioned polyolefin-metal bonded structures and vessel closures.

These and other objects of the invention as well as fuller understanding of the advantages thereof can be had by reference to the following detailed description and claims.

SUMMARY OF THE INVENTION

The foregoing objects are achieved according to the present invention by a polyolefin-metal bonded structure in which a polyolefin layer is bonded to a metal substrate through a primer layer having a novel multilayer distribution structure wherein a coating film-forming base resin (B) is distributed predominantly in that portion of the primer layer contiguous to the surface of the metal substrate and a modified olefin resin (A) is distributed predominantly in that portion of the primer layer contiguous to the polyolefin layer.

We have discovered that when a polyolefin layer is bonded to a metal substrate through a primer layer, if a polar group-containing ethylenically unsaturated monomer-modified olefin resin (A) having a specific polar group concentration and a specific degree of crystallization and a coating film-forming base resin (B) are incorporated at a specific ratio into a specific mixed solvent to form a paint, and the primer layer is formed by using such paint, there is obtained a novel multi-layer distribution structure comprising the base resin (B) distributed predominantly in the portion of the primer layer contiguous to the surface of the metal substrate and the modified olefin resin (A) distributed predominantly in the region of the primer layer contiguous to the polyolefin layer and having a concentration gradient of the two components (A) and (B) in the thickness direction. By virtue of the presence of this primer layer, the strength of the bond between the metal substrate and the polyolefin and the corrosion resistance of the metal substrate as well as the processability of the bonded structure are remarkably improved.

In accordance with the invention, the polyolefin-metal bonded structure comprises a metal substrate and a polyolefin layer bonded to the metal substrate through a primer layer, said primer layer comprising (A) a polar group-containing ethylenically unsaturated monomer-modified olefin resin or polymer (hereinafter referred to as "modified olefin resin") containing polar groups at a concentration of between about 0.01 and 200 and preferably between about 0.1 and 70 milliequivalents per 100 g of the polymer and having a degree of crystallinity of at least about 50% and preferably at least about 70%, and (B) a coating film-forming base resin in an (A)/(B) weight ratio of between about 0.2/99.8 and 40/60. The primer layer has a multi-layer distribution structure having concentration gradients of components (A) and (B) in the thickness direction such that the base resin (B) is distributed predominantly in the portion contiguous to the surface of the metal substrate and the modified olefin resin (A) is distributed predominantly in the portion contiguous to the polyolefin layer. In such circumstances the primer layer can be regarded as being divided into three sub-layers, the distribution ratio, Dx, which is defined by the following formula:

$$D_x = 10000 \, W_X / (W)(C_A)$$

wherein

W is the weight of the primer layer per unit surface area (mg/dm$^2$), $C_A$ is the average percent by weight of the modified olefin resin contained in the primer layer, and $W_X$ is the weight per unit area (mg/dm$^2$), of the modified olefin resin in each sub-layer, being at least about 50% and preferably at least about 70% in the sub-layer contiguous to the polyolefin layer and not greater than about 10% and preferably not greater than about 5% in the sub-layer contiguous to the surface of the metal substrate.

In accordance with another aspect of the invention, the polyolefin resin-metal bonded structure is prepared by a process comprising applying an undercoat paint onto a metal substrate and fusion-bonding a polyolefin layer to the metal substrate through a layer of the undercoat paint, wherein said undercoat paint comprises the modified olefin resin (A) and the coating film-forming base resin (B) in the aforesaid (A)/(B) weight ratio in a mixed solvent containing at least about 70% by weight of a solvent component having a solubility parameter of between about 8.5 and 9.5 and in which the maximum difference between the atmosphere boiling points of the solvents is at least about 20° C., preferably at least about 25° C.

Metal substrates suitable for use in the present invention include metals and alloys such as iron, steel, copper, aluminum, zinc, stainless steel, bronze, cupronickel, duralmin and die casting alloys. The metal substrate can also be composed of steel plated with zinc, tin, chromium and the like or steel treated with phosphoric acid or chromic acid. The shape of the metal substrate is not particularly critical. For example, the substrate can be in the form of a metal foil, rolled thin plate, panel, sheet, rod, beam, other formed material, a straight or twisted wire, a crown shell, cap, other vessel, a construction material or a vehicle construction. Preferably, the invention is applied to an untreated steel plate (so-called black plate), a steel plate having the surface treated with phosphoric acid or chromic acid or electrolytically treated with chromic acid, or a steel plate whose surface has been electrolytically plated or fusion-plated with tin, zinc and the like. In addition, the bondability of these metal substrates to an olefin resin can be effectively enhanced while further improving the corrosion resistance of the metal substrate by optionally coating the surface of the substrate in advance with a known primer such as an epoxy-amino resin, a phenol-epoxy resin, an epoxy-urea resin, a phenol-epoxy-vinyl resin, an epoxy-vinyl resin or the like.

The degree of crystallization in the modified olefin resin significantly influences the formation in the primer layer of the aforementioned multi-layer distribution structure having specific concentration gradients in the thickness direction. The degree of crystallization referred to herein is determined according to the X-ray diffraction method described by S. L. Aggarwal and G. D. Tilley in the Journal of Polymer Science, 18, pp. 17–26 (1955). We have found that when the degree of crystallinity in the modified olefin resin is less than about 50%, it is still possible to disperse the modified olefin resin into the coating film-forming base resin but it is very difficult to distribute the modified olefin resin predominantly in the top portion of the primer layer contiguous to the polyolefin layer.

The concentration of polar groups in the modified olefin resin has a significant influence on its compatibility with or affinity for the coating film-forming base resin and the polyolefin layer and also on the formation in the primer layer of the aforementioned multi-layer distribution structure. When the polar group concentration in the modified olefin resin is below the aforementioned range, the compatibility of the modified olefin resin with the base resin is lowered and, as a result, even if the modified olefin resin is distributed predominantly in the top face portion of the primer layer, no satisfactory bonding strength between the polyolefin layer and the primer layer is achieved. Conversely, if the polar group concentration in the modified olefin resin exceeds the aforementioned range, the modified olefin resin either lacks sufficient compatibility with or affinity for the polyolefin layer, thereby resulting in concomitant unsatisfactory bonding strength between the polyolefin layer and the primer layer, or has too high a compatibility with or affinity for the base resin whereupon it is difficult to form a multi-layer distribution structure in which the modified olefin resin (A) is distributed predominantly in the top portion of the primar layer.

In contrast, when a modified olefin resin having a degree of crystallinity of at least 50% and containing polar groups at a concentration of 0.01 to 200 milliequivalents per 100 g of the polymer is used according to the present invention, a novel multi-layer distribution structure is formed in the primer layer in which the modified olefin resin (A) is distributed predominantly in the upper portion and the base resin (B) is distributed predominantly in the lower portion, and the polyolefin layer is bonded to the metal substrate with optimum strength through the specific modified olefin resin-base resin distribution structure in the primer layer. Further, whereas incorporation of a modified olefin resin into the primer layer normally tends to reduce the corrosion resistance of the metal substrate, the present multi-layer distribution structure of the primer layer is characterized by a high corrosion resistance comparable to that attainable by a primer layer free of a modified olefin resin.

In the practice of the present invention, any of the products formed by incorporating known polar group-containing ethylenically unsaturated monomers into main or side chains of olefin resins by known methods such as graft copolymerization, block copolymerization, random polymerization and terminal treatment can be used as the modified olefin resin consistent with the foregoing requirements.

Polar group-containing ethylenically unsaturated monomers suitable for use in the present invention include monomers having a carbonyl group (—CO—) derived from a carboxylic acid, carboxylic acid salt, carboxylic anhydride, carboxylic acid ester, carboxylic acid amide or imide, an aldehyde or a ketone; monomers having a cyano group (—CN); monomers having a hydroxyl group; monomers having an ether group; and monomers having an oxirane ring

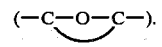

These monomers can be used singly or in combination. Examples of suitable monomers are carbonyl group-containing monomers including ethylenically unsaturated carboxylic acids such as acrylic acid, methacrylic acid, maleic acid, fumaric acid, crotonic acid, itaconic acid, citraconic acid and 5-norbornene-2,3-dicarboxylic acid; ethylenically unsaturated carboxylic anhydrides such as maleic anhydride, citraconic anhydride, 5-norborne-2,3-dicarboxylic anhydride and tetrahydrophthalic anhydride; ethylenically unsaturated esters such as ethyl acrylate, methyl methacrylate, 2-ethylhexyl acrylate, monoethyl maleate, diethyl maleate, vinyl acetate and vinyl propionate; ethylenically unsaturated amides and imides such as acrylamide, methacrylamide and maleimide; ethylenically unsaturated aldehydes and ketones such as acrolein, methacrolein, methylvinyl ketone and butylvinyl ketone; cyano group-containing monomers such as acrylonitrile and methacrylonitrile; hydroxyl group-containing monomers such as propyl gamma-hydroxy-methacrylate and ethyl beta-hydroxyacrylate; ether group-containing monomers such as methylvinyl ether, ethylvinyl ether and ethylallyl ether; and oxirane ring-containing monomers such as glycidyl acrylate, glycidyl methacrylate and glycidylvinyl ether.

Among the foregoing monomers, ethylenically unsaturated carboxylic acids and ethylenically unsaturated carboxylic anhydrides are especially preferred for use in the present invention. These can be used singly or in combination with other monomers for modification of the olefin resins.

The polar group-containing monomer is bonded to the main or side chain of an olefin resin so that the polar group concentration of the resulting modified olefin resin is in the aforementioned range and the degree of crystallinity is at least about 50%.

Examples of olefin resins suitable for use in the present invention include polymers of ethylene, propylene, butene-1, pentene-1 and 4-ethylpentene-1. These olefins can be polymerized singly or in the form of a mixture of two or more of them to form the olefin resin.

In order to modify an olefin resin so that the foregoing requirements are satisfied, for example, in case of a grafting treatment, it is necessary to select as the starting olefin resin (trunk polymer) one having a degree of crystallinity of at least 50% and to conduct the grafting treatment under conditions such that the degree of crystallinity of the resin is not reduced below 50%. For this reason, high density polyethylene or isotactic polypropylene or a highly crystalline ethylene-propylene copolymer is preferably employed as the trunk polymer. Also, medium density polyethylene and low density polyethylene having a degree of crystallinity greater than 50% can also be used under such mild grafting conditions as will not cause any substantial reduction of the degree of crystallinity.

The grafting treatment can be conducted under known conditions consistent with the above requirements. For example, when a trunk polymer composed of an olefin resin is contacted with a polar-group containing ethylenically unsaturated monomer in the presence of a radical initiator or under conditions which initiate radical polymerization, a modified olefin resin is readily obtained. The trunk polmer can be contacted with the monomer in a homogenous solution system, a solid-liquid or solid-gas heterogenous system or a homogenous melt system. Suitable radical initiators include, for example, organic peroxides such as dicumyl peroxide, t-butyl hydroperoxide, dibenzoyl peroxide and dilauroyl peroxide and azonitriles such as azobisisobutyronitrile and azobisisopropionitrile. These initiators can be used in conventional catalytic amounts. Conditions for initiating radical polymerization include, for example, ionizing radiation such as X-rays, gamma-rays and electron beams; ultraviolet radiation, combinations of ultraviolet rays with sensitizers, and mechanical radical initiating means such as kneading (mastication) and ultrasonic vibration.

In the case of reaction in a homogenous solution system, the olefin resin, monomer and initiator are dissolved in an aromatic solvent such as toluene, xylene or tetraline wherein the grafting reaction is carried out. The resulting modified olefin is recovered as a precipitate. In the case of reaction in a heterogenous system, a powder of the olefin resin is contacted with the monomer or a solution of the monomer under ionizing radiation to effect grafting. In the case of reaction in a homogenous melt system, a blend of the olefin resin and monomer, optionally together with an initiator, is melt-extruded by an extruder or kneader to form a modified olefin resin. In each case, the resulting modified resin can be subjected to a purifying treatment such as washing or extraction to remove the unreacted monomer, the homopolymer or the residual initiator. Further, when the resulting modified olefin resin is crystallized from an aromatic solvent such as mentioned above and the crystallization conditions are appropriately controlled, the particle size can be adjusted.

Any resin heretofore known to be useful for formating anti-corrosive primer layers can be used as the coating film-forming base resin in the present invention. In general, in order to achieve the above-mentioned multi-layer distribution structure in the primer layer and increase the bondability of the primer layer to the metal substrate, it is desirable to use a coating film-forming base resin having a density greater by at least 0.1, i.e., at least 10 percent greater than, the density of the modified olefin resin, generally a density of 1.2 to 1.3 times greater than the density of the modified olefin resin, and containing hydroxyl functional groups and/or carbonyl functional groups at a concentration of at least 1 milliequivalent per gram of base resin, and preferably 3 to 20 milliequivalents per gram of base resin.

We have found that when a base resin having a density at least 10 percent greater than the density of the modified olefin resin is used, it becomes much easier to achieve the specific multi-layer distribution structure having the aforementioned concentration gradient in the primer layer. Further, if the concentration of functional groups such as hydroxyl or carbonyl groups in the base resin is at least 1 milliequivalent per gram of the polymer, the adhesion of the primer layer to the metal substrate and the corrosion resistance can be further improved.

In the base resin used to form the primer layer according to the present invention, hydroxyl groups can be included in the main or side chain of the polymer in the form of alcoholic hydroxyl groups, phenolic hydroxyl groups or a mixture thereof, and carbonyl groups can be introduced into the main or side chain of the polymer in the form of carboxylic acid, carboxylic acid salt, carboxylic acid ester, carboxylic acid amide, ketone, imide, urea or urethane substituents.

Base resins meeting the foregoing requirements can be selected from thermosetting and thermoplastic resin vehicles conventionally used in formulating paints. For example, one can use thermosetting resins such as phenolformaldehyde resins, urea-formaldehyde resins, melamineformaldehyde resins, xylene-formaldehyde resins, epoxy resins, alkyd resins, polyester resins, thermosetting acrylic resins, urethane resins and mixtures thereof, and thermoplastic resins such as acrylic resins, vinyl chloride-vinyl acetate copolymers, vinyl chloride-vinyl acetate-maleic acid copolymers, vinyl butyral resins, other vinyl resins, styrene-butadiene-acrylic acid ester copolymers, polyamide resins and petroleum resins, consistent with the foregoing requirements.

So-called thermosetting resins are preferred for use as base resins according to the present invention, and among them, phenolic resin-epoxy resin paints, urea resin-epoxy resin paints, melamine resin-epoxy resin paints and phenolic resin-vinyl resin paints are especially preferred.

In formulating a coating composition for preparing a primer layer according to the invention, the modified olefin resin (A) is combined with the coating film-forming base resin (B) at an (A)/(B) weight ratio of from about 0.2/99.8 to 40/60. Since the base resin is distributed in the primer layer predominantly in the portion contiguous to the metal substrate and the modified olefin resin is distributed predominantly in the portion contiguous to the polyolefin layer, even if the content of the modified olefin resin (A) is as low as 0.2% by weight, the bonding force between the primer layer and the polyolefin layer can be increased, and even if the content of the base resin (B) is as low as 60% by weight, the adhesion between the primer layer and the metal substrate can be enhanced.

The amount of the primer layer coated on the metal surface, i.e., the weight of non-volatile resin solids per unit surface area of the metal substrate, is preferably 10 to 500 mg/dm$^2$, with 30 to 100 mg/dm$^2$ being especially preferred. If the amount or weight of the primer layer is within these ranges, a good combination of high corrosion resistance and a high adhesion can be attained. It is preferred that the amount of modified olefin resin (A) used to form the coating be 0.01 to 100 mg/dm$^2$, especially 0.1 to 10 mg/dm$^2$, and the amount of base resin (B) is 1 to 500 mg/dm$^2$, especially 10 to 100 mg/dm$^2$, consistent with the foregoing requirements.

In one embodiment of the process of invention, a liquid coating composition comprising the modified olefin resin (A) and the base resin (B) at the aforementioned weight ratio in a mixed solvent described hereinafter is prepared. The coating composition is applied to the surface of the metal substrate, and the mixed solvent is evaporated to obtain the aforementioned novel multi-layer distribution structure in the resulting primer layer.

In order to effectively achieve the multi-layer distribution structure in the primer layer, it is important that the mixed solvent contain at least 70% by weight of a solvent component having a solubility parameter (Sp value) of 8.5 to 9.5 and the difference between the boiling point of a solvent ($S_1$) having a highest boiling point in the mixed solvent and the boiling point of a solvent ($S_2$) having a lowest boiling point in the mixed solvent should be at least 20° C., preferably at least 25° C.

When a solvent having a solubility parameter (Sp value) within the above range is used in an amount of at least 70% by weight based on the total mixed solvent, the base resin (B) can be completely dissolved in the mixed solvent and the moldified olefin resin (A) is dispersed or suspended in the form of fine particles having a so-called emulsion particle size of between about 2 and 50 microns, preferably between about 5 and 20 microns. If the paint thus prepared is coated and baked, a stable multi-layer distribution structure as described hereinabove can be formed. When a solvent having a solubility parameter (Sp value) included in the above range is not contained in the mixed solvent or its content is lower than 70% by weight, it is generally difficult to form a paint having the above-mentioned dispersion state which is capable of forming a multi-layer distribution structure.

When a single solvent is used or when the difference in the boiling points of two or more solvents is less than 20° C., it is difficult to form a primer layer having the above-mentioned multi-layer distribution structure, and the processability of the primer-coated metal substrate or the polyolefin-metal bonded structure is less satisfactory. In contrast, when the modified olefin resin (A) and the base resin (B) are dissolved in the aforementioned specific mixed solvent and the resulting paint is coated and dried, as will be apparent from examples hereinbelow, a multi-layer structure is formed in which the modified olefin resin is distributed predominantly in the surface portion of the resulting coating. Without wishing to be bound by theory, it is believed that under conditions of drying or baking the coated paint, the temperature of the coating or the solvent composition varies with a certain gradient during the evaporation of the solents and this temperature variation promotes formation of the desired multi-layer distribution structure.

The solvent ($S_1$) having a higher boiling point is used in an amount of 10 to 70% by weight, preferably 20 to 60% by weight, based on the total solvents, and the solvent ($S_2$) having a lower boiling point is used in an amount of 10 to 70% by weight, preferably 20 to 60% by weight, based on the total solvents. Suitable combinations of solvents satisfying the foregoing requirements are ketones such as acetone, methylethyl ketone (MEK), methylisobutyl ketone (MIBK), cyclohexanone and isophorone, alcohols and aromatic hydrocarbons such as toluene, xylene and decalin.

Examples of suitable combinations of solvents are methylisobutyl ketone/methylethyl ketone, methylisobutyl ketone/diacetone alcohol/xylene, and n-butanol/xylene/cyclohexanone/isphorone.

A coating composition for forming the primer layer is prepared, for example, by dissolving the base resin (B) in one or more of the foregoing organic solvents to form a solution and adding the modified olefin resin (A) in the form of a solution in, for example, hot xylene or decalin to the base resin solution to form a homogenous composition. In general, it is preferred that the resin concentration in the thus formed liquid coating composition be 10 to 50% by weight.

Prior to forming a primer layer on the surface of the metal substrate, the surface of the latter can, if desired, be degreased and washed according to known means, whereupon the above-mentioned liquid coating composition is applied to the surface of the metal substrate according to known coating procedures such as dip coating and electro-deposition coating.

The liquid coating composition applied to the metal substrate is then dried or baked under heating. In general, the heating is desirably carried out at a temperature greater than the melting point of the modified olefin resin, preferably 150° to 200° C. By means of this heat treatment, the base resin is distributed predominantly in the portion contiguous to the metal substrate and the modified olefin resin is distributed in the surface portion of the primer layer, whereby a multi-layer distribution structure is formed. While not wishing to be bound by theory, it is believed that the combination of the modified olefin resin (A) and base resin (B) has a tendency to undergo phase separation between two resins under the drying conditions whereupon the modified olefin resin (A) having a lower specific gravity rises in the surface portion, and that this tendency to undergo phase separation is promoted by evaporation of the solvents. In the case where the base resin is a thermosetting resin, curing of the base resin is brought about by the heat treatment, and it is believed that formation of the multi-layer distribution structure is promoted also by curing of the base resin. Any heating devices or means can be used for this heat treatment so long as the temperature is maintained within the aforementioned range. For example, heating furnaces customarily used for baking coatings, such as a hot air furnace, infrared heating furnace, high frequency induction heating furnace and the like, can be used in the present invention.

From the viewpoints of operating facility and productivity, it is especially preferred that the modified olefin resin (A) and base resin (B) constituting the primer layer be applied in the form of a liquid coating composition comprising both resins. However, a primer layer having the above mentioned multi-layer distribution structure can also be formed according to the following method.

A solution containing the base resin alone is coated on the cleaned surface of the metal substrate, a solution or fine dispersion of the modified olefin resin is then coated on the base resin coating, and the resulting composite coating is heated at a temperature higher than the melting point of the modified olefin resin. In this case, in order to dissolve both resins in each other at the interface between the two resin coatings and form a mutilayer structured primer having a high peel strength, it is important that a solution or dispersion of the modified olefin resin be coated on an unbaked coating of the base resin and the composited coating be heated at a temperature higher than the melting point of the modified olefin resin. For example, when a coating of the modified olefin resin is formed on a baked coating of the base resin, a polyolefin-metal bonded structure having a high bonding strength cannot be obtained at all. The reason is believed to be that peeling readily occurs between the base resin layer and the modified olefin resin layer. When this two-step coating method is adopted, it is important that sufficient mingling of both resins takes place at the interface between the base resin layer and the modified olefin resin layer or in areas adjacent to the interface. In this coating method, other conditions such as amounts of the respective resins coated, coating means and heat treatment means can be the same as in the first-mentioned method.

In another embodiment of the present invention, a so-called double-coat primer layer can be formed by coating a conventional liquid primer composition free of the modified olefin resin (A) onto the metal substrate and then applying a liquid coating composition containing the modified olefin resin (A) and base resin (B) to this primer coating.

The fact that the primer layer formed according to the present invention has the above-mentioned multi-layer distribution structure can be confirmed by dividing the primer layer in the thickness direction into the following three sub-layers, namely a topmost sub-layer ($L_S$) nearest to the polyolefin layer, an intermediate sub-layer ($L_M$) and a lowermost sub-layer ($L_B$), and determining the distribution ratios (contents, %) of the modified olefin resin in the respective sub-layers. More specifically, a heated-treated primer coating is caused to fall in contact with steel wool attached to a rotation shaft, thereby peeling off a layer having a predetermined thickness (about 1 micron) by abrasion. The iron component is removed from the powder of the peeled coating by using a magnet and the residal powder is subjected to infrared absorption analysis using the KBr pellet method. An absorption, e.g., the methylene stretching frequency (2920 cm$^{-1}$), which does not overlap the characteristic absorption by the base resin is chosen as the characteristic absorption for the modified olefin resin, and the concentration of the latter is determined from a calibration curve.

In the bonded structure of the present invention, the primer layer is characterized in that (1) the distribution ratio of the modified olefin resin (A) is at least 50% by weight, preferably at least 70%, in the topmost sub-layer ($L_S$), and (2) the distribution ratio of the modified olfin resin (A) does not exceed 10%, and preferably does not exceed 5%, in the lowermost sub-layer ($L_B$).

Polyolefins suitable for application to the primer layer include, for example, polyolefins such as low-, medium-, and high-density polyethylenes, isotactic polypropylene, ethylene/butene-1 copolymers, polybutene-1, ethylene/hexene copolymers, ethylene/propylene copolymers and ethylene/propylene/conjugated diene terpolymers, and olefin copolymers and modified polyolefins composed mainly of an olefin and containing a small amount of an ethylenically unsaturated monomer other than an olefin, e.g., ethylene/vinyl acetate copolymers (EVA), saponified ethylene/vinyl acetate copolymers (EVAL), ethylene/acrylic acid copolymers, ethylene/methyl methacrylate copolymers, polyethylenes modified with unsaturated carboxylic acids such as maleic acid, acrylic acid, methacrylic acid and esters thereof, polypropylenes modified with unsaturated carboxylic acids such as maleic acid, acrylic acid and esters thereof, ionomers and chlorosulfonated polyethylene. These polyolefins can be used singly or in the form of mixtures of two or more of them. One or more elastomers such as ethylene/propylene rubber (EPR), ethylene/propylene/diene rubber (EPDM), polyisobutylene (PIB), butyl rubber (BR), natural rubber (NR), stereospecific polyisoprene, nitrile rubber (NBR), polybutadienne (PB), styrene/butadiene copolymers, styrene/isoprene copolymer and polychloroprene (CR) can be incorporated in amounts of 1 to 60% by weight into polyethylene, polypropylene or EVA, whereby elastic properties necessary for packings or sealants can be improved.

Various additives can be incorporated into the polyolefin according to procedures known in the art. For example, one can incorporate antioxidants or stabilizers of the phenol, organic sulfur, organic nitrogen, or organic phosphorus types; lubricants such as metal soaps or other fatty acid derivatives; fillers such as calcium carbonate, white carbon, titanium white, magnesium carbonate, magnesium silicate, carbon black and clays; and coloring agents.

A cross-linking agent, foaming agent or mixtures thereof can be incorporated into the polyolefin used in the present invention, and a cross-linked, foamed, or cross-linked and foamed polyolefin layer can be formed. For example, when it is desired to form a coating of a polyolefin having optimum heat resistance, durability and mechanical properties such as elasticity on the metal substrate, it is recommended that a cross-linking agent be incorporated in the polyolefin. When it is desired to form a coating having optimum cushioning ability necessary for a packing or sealant, it is preferred to incorporate a foaming agent, optionally with a cross-linking agent, into the polyolefin. Examples of cross-linking agents decomposing at temperatures near the processing temperature (softening point) of the polyolefin used are organic peroxides such as dicumyl peroxide, di-t-butyl peroxide, cumyl hydroperoxide and 2,5-dimethyl-2,5-di(tert-butylperoxy)hexene-3; and foaming agents decomposing at temperatures near the processing temperature include 2,2-azobisisobutyronitrile, azodicarbonamides and 4,4-hydroxybenzenesulfonylhydrazide. Cross-linking agents can be used in amounts of about 0.1 to 5% by weight based on the weight of the polyolefin and foaming agents can be used in amounts of about 0.2 to 10% by weight.

The polyolefin layer is heat-bonded to the metal substrate through the aforementioned primer layer at a temperature at least about 10° C. greater than the higher of the melting point of the modified olefin resin (A) and the melting point of the polyolefin, generally at 120° to 300° C., and preferably at 150° to 230° C. The polyolefin is applied in the form of a film, sheet, powder or other molded article to the primer layer formed on the metal substrate, and the polyolefin is heated at the above-mentioned temperature to fusion-bond the polyolefin to the primer. The assembly is then cooled to obtain a bonded structure. Heating of the polyolefin can be accomplished by various means, for example, (a) passing the assembly through a heated furnace, (b) heating the assembly by the heat transferred from a heated press or roll, (c) heating the metal substrate in advance or in situ by high frequency induction heating or the like and fusion-bonding the polyolefin to the metal substrate, and (d) heating the assembly by infrared rays, ultrasonic vibration, plasma or laser.

Another method for bonding the polyolefin resin to the metal substrate through the primer layer according to the present invention comprises extruding a polyolefin melt at the above-mentioned temperature onto the primer layer formed on the metal substrate to fusion-bond the polyolefin to the metal substrate through the primer layer. In this method, the molten polyolefin can be applied in the form of a continuous molded article such as a tape, film, sheet, tube or sheath onto the metal substrate using extrusion coating techniques. Another suitable method involves extruding the polyolefin in molten form onto the primer layer and then fusion-bonding it to the metal substrate while the molten polyolefin is cooled and molded into a desirable shape by a roll, press or stamper. The former extrusion coating method is advantageous when a continuous coating of the polyolefin onto the metal substrate is desired, and the latter method is advantageous when a layer of the polyolefin is to be formed on a specific portion of the metal substrate. Fusion bonding of the polyolefin to the metal substrate can be completed in a very short time e.g., on the order of a microsecond or millisecond, if desired.

When the polyolefin applied to the metal substrate is to be cross-linked, foamed, or cross-linked and foamed, after fusion-bonding of the polyolefin to the primer layer on the metal substrate the polyolefin layer is heated at a temperature higher than the decomposition temperature of the foaming agent or cross-linking agent, as the case may be.

When the metal substrate is a thin structure such as a foil, sheet, tube or vessel, the polyolefin layer can be applied to either one surface of the metal substrate or both surfaces of the substrate. Further, a sandwich-bonded structure can be formed by fusion-bonding both surfaces of the polyolefin layer to metal substrates such as foils or sheets.

By heat-bonding the polyolefin layer to the metal substrate through the primer later having the above-mentioned specific multi-layer distribution structure, an unexpectedly high peel strength is achieved between the polyolefin layer and the metal substrate. In a structure formed by fusion-bonding the polyolefin layer to the metal substrate directly, without an intermediate primer layer, corrosion of the metal substrate readily occurs at the interface between the metal substrate and polyolefin layer, and severe corrosion of the metal substrate advances from the uncoated portion or edge portion in this bonded structure unless the entire surface of the metal substrate is covered with the polyolefin, and such corrosion accelerates peeling of the polyolefin layer from the metal substrate. This drawback is effectively eliminated by the present invention through prior formation of the above-mentioned specific primer layer on the metal substrate.

As will be apparent from the foregoing, the present invention is highly useful for producing crown closures, bottle caps, can lids and other vessel closures which have a packing or sealant derived from a polyolefin. Further, by virtue of the aforementioned desirable combination of high peel resistance and high corrosion resistance, the bonded structure of the present invention is eminently useful for producing various lined vessels such as cans, tanks, chemical reaction vessels and flexible packages, construction materials and vehicle construction materials such as wall plates and roofing materials, and various ordinary utensils such as laminated tables, decorating materials, insulating materials, coated wires, coated cables and the like.

DESCRIPTION OF PREFERRED EMBODIMENTS

The following examples are presented for the purpose of illustrating without limitation the features of the present invention and the advantages thereof. In the examples, parts and percentages are by weight unless otherwise indicated.

EXAMPLE I

A mixture of 1.0 mole of p-cresol, 1.2 moles of formaldehyde and 0.2 mole of ammonia is heated on a water bath to form an ammonia-cresol base resin. A quantity (40 parts) of this resin and 60 parts of a bisphenol-A type epoxy resin (Epikote® 1007 manufactured by Shell Chemical) are dissolved in a mixed organic solvent made up of equal amounts of methyisobutyl ketone and methylethyl ketone to form a base resin solution. Next, a modified olefin resin of the type indicated in Table 1 is dissolved in hot xylene to form a 10% solution. This solution is added to the base resin solution with sufficient agitation so that the amount of the modified olefin resin added to the base resin is as indicated in Table 1. In this way, a primer coating composition having a total solids content of about 30% is obtained.

The primer coating composition is roll-coated on a surface-treated steel plate having a thickness of 0.2 mm (Hi-Top® manufactured by Toyo Seikan) in an amount such that the thickness of the coating after curing and drying is 6 microns and the applied composition is heated at 200° C. for 10 minutes to form a primer layer - coated steel plate.

The modified olefin resin used in this example is prepared in a conventional manner using a stainless steel pressure reaction vessel equipped with a dropping funnel, a thermometer and mechanical stirrer. In the case of samples E-1 to E-6, polyethylene having a degree of crystallization of 93.1% and a melt index of 2 is used as the starting olefin resin; in the case of samples E-7 to E-10, polyethylene having a degree of crystallization of 90.2% and a melt index of 0.2 is used; and in case of sample E-11, polyethylene having a degree of crystallinity of 67.5% and a melt index of 12 is used as the starting olefin resin. In case of sample P-1, polypropylene having a degree of crystallization of 75.1% and a melt index of 5 is used as the starting olefin resin. The starting olefin resin and p-xylene are charged to the reaction vessel, the inside atmosphere is replace by nitrogen and the mixture is heated to form a xylene solution containing 10% of the olefin resin. A xylene solution of maleic anhydride and a p-xylene solution of dicumyl peroxide are added dropwise with agitation to the vessel. The reaction conditions and the amount of maleic anhydride added are appropriately adjusted to obtain the degree of modification shown in Table 1. The amount of dicumyl peroxide added is 0.7 g per 100 g of the starting olefin resin. The reaction temperature is selected from the range of 125° to 165° C. and the maleic anhydride solution is added over a period of 4 to 10 hours. The quantity of maleic anhydride added is the calculated amount necessary for attaining the desired degree of modification (polar group concentration). After completion of the reaction, the mixture is cooled and the modified olefin resin product is recovered by filtration and washed with acetone. The degree of crystallinity of the recovered modified olefin resin is determined according to the aforementioned X-ray diffraction method and the degree of modification with maleic anhydride is determined by elemental analysis method. The results obtained are shown in Table 1.

The corrosion resistance of the abovementioned coated steel plate is evaluated on the basis of the degree of rusting after 10 days' outdoor exposure, and the processability is evaluated based on the degree of formation of damages upon bending to 2%. The coating layer (primer layer) is divided into three thin sub-layers having a thickness of about 2 microns (topmost sub-layer, $L_S$, intermediate sub-layer, $L_M$, and lowermost sub-layer, $L_B$) according to the surface polishing method.

The amount of the modified polyethylene in each sub-layer is determined by infrared absorption and the distribution ratio (%) is calculated. The results are shown in Table 1.

A sheet composed of low density polyethylene (having a melt index of 2 and a density of 0.920) and having a thickness of about 0.5 mm is heat-bonded to the primer coated steel plate under a pressure of 5 kg/cm² at 180° C. for 3 minutes by using a hot press, and the assembly is quickly cooled to form a metal substrate/primer coating/polyethylene bonded structure. The peel strength between the polyethylene and the metal substrate is determined at a peeling speed of 50 mm/min, a temperature of 20° C. and a peeling angle of 180° by using an Instron type universal tensile tester to obtain results shown in Table 1.

TABLE 1

| Sample* No. | Modified Olefin Resin Degree (%) of Crystallinity | Modified Olefin Resin Degree (meq./g) of Modification | Amount added (%) | Distribution Ratio (%) of Modified Olefin Resin Sub-layer $L_S$ | Distribution Ratio (%) of Modified Olefin Resin Sub-layer $L_M$ | Distribution Ratio (%) of Modified Olefin Resin Sub-layer $L_B$ | Peel Strength (mg/cm) of Bonded Structure | Properties of Coated Steel Plate Corrosion Resistance | Properties of Coated Steel Plate Processability |
|---|---|---|---|---|---|---|---|---|---|
| Comparison 1 | — | — | 0 | 0 | 0 | 0 | 0 | O | O |
| Comparison 2 | 93.1 | 0 | 20 | 98.5 | 1.0 | 0.5 | 0 | Δ | x |
| E-1 | 92.5 | 0.01 | 20 | 94.0 | 5.8 | 0.2 | 850 | O | O |
| E-2 | 87.1 | 0.58 | 20 | 91.2 | 8.0 | 0.8 | 1050 | O | O |
| E-3 | 74.9 | 30.5 | 20 | 86.5 | 12.1 | 1.4 | 2720 | O | O |
| E-4 | 69.2 | 72.2 | 20 | 80.1 | 14.7 | 5.2 | 1450 | O | O |
| E-5 | 60.7 | 206 | 20 | 57.5 | 32.7 | 9.8 | 550 | O | Δ |
| E-6 | 48.9 | 253 | 20 | 37.4 | 34.5 | 28.1 | 120 | x | x |
| E-7 | 87.1 | 0.58 | 1.0 | 99.3 | 0.6 | 0.1 | 930 | O | O |
| E-8 | 87.1 | 0.58 | 5.0 | 95.5 | 4.2 | 0.3 | 1000 | O | O |
| E-9 | 87.1 | 0.58 | 30 | 75.5 | 21.0 | 3.5 | 1120 | O | O |
| E-10 | 87.1 | 0.58 | 50 | 54.8 | 27.2 | 18.0 | 400 | x | x |
| E-11 | 65.8 | 10.2 | 20 | 59.2 | 33.4 | 7.4 | 1050 | O | O |
| P-1 | 60.9 | 50.6 | 20 | 79.7 | 14.3 | 6.0 | 2120 | O | O |

*Note
Comparasion 1: sample free of modified olefin resin
Comparasion 2: sample in which unmodified high density polyethylene is added
E: sample in which maleic acid anhydride - modified polyethylene is added
P: sample in which maleic anhydride - modified polypropylene is added The results shown in Table I establish that in the bonded structure of the present invention, the modified olefin resin is distributed predominantly in the surface portion of the primer layer. However, if the degree of crystallization or degree of modification is outside the range specified in the present invention as in Sample 3, the predominant distribution of the modified olefin resin is not attained in the surface portion and the properties of the primer coating are degraded. Further, when the amount of added modified olefin resin is too large as in Sample 4, smooth and lustrous coating cannot be obtained, and the bonding strength is reduced accompanied by peeling at the interface between the coating layer and the metal substrate.

EXAMPLE 2

To 80 parts of the base resin used in Example 1 are added 20 parts of a low molecular-weight vinyl chloride/vinyl acetate copolymer (VYHH ® manufactured by Union Carbide), and the resulting composition is dissolved in an organic solvent (comprising 35 parts of MIBK, 35 parts of MEK, 25 parts of xylene and 5 parts of isophorone) to form a base resin solution. Then the same maleic acid anhydride-modified polyethylene solution in 120° C. xylene as used for formation of sample E-8 in Example 1 is added in an amount of 5% (as solids) to the base resin solution to form a primer coating composition having a solids content of 30%. In the same manner as described in Example 1, a metal/primer layer/polyethylene bonded structure is prepared by using the above-prepared primer coating composition. For purposes of comparison a bonded structure is prepared in the same manner as above except that oxidized polyethylene (having a molecular weight of 5000, a density of 0.96 and a saponification value of 19.2 -g ROH/g) is used instead of the maleic anhydride-modified polyethylene. With respect to each of these two bonded structures, 10 lots are prepared starting with the primer coating composition, formation of the primer coating on the steel plate and lamination of polyethylene, and in each lot, 20 samples are prepared. Accordingly, 200 samples are prepared with respect to each bonded structure.

With regard to the two kinds of bonded structures, the peel strength of the polyethylene layer is measured and deviations among the lots are calculated. As a result, in the case of the bonded structure of the present invention, it was found that the average peel strength was 1020 g/cm and the standard deviation was 0.052, but in case of the comparative bonded structure, it was found that the average peel strength was 900 g/cm and the standard deviation was 14.3. Accordingly, this confirms that stable bonded structures having excellent properties can be obtained very according to the present invention.

EXAMPLE 3

In the same manner as described in Example 1, a primer having a total solids content of 30% is prepared in the form of a base resin composition comprising 50 parts of an acrylic resin made from 2 moles of glycidyl methacrylate, 4 moles of methyl methacrylate and 4 moles of 2-ethylhexyl acrylate and 50 parts of an epoxy resin (Epikote 1009) dissolved in a mixed solvent made up of 35 parts of MIBK, 35 parts of MEK and 30 parts of xylene to form a base resin solution. A primer coating composition containing maleic anhydride-modified polyethylene (same as used for formation of sample E-3 in Example 1) at a concentration of 15% based on the solids in the base resin solution is prepared as described in Example 1. In the same manner as in Example 1, the primer coating composition is coated on one surface of a tinplate sheet and then baked. On the opposite surface, an epoxyamino paint layer, a print layer and an overcoat layer (epoxy ester type resin) are formed in succession to form a double surface-coated sheet.

From this coated sheet, crown shells are prepared by a crown-forming press so that the printed surface is located ouside. Polyethylene liners are formed on these crown shells. More specifically, polyethylene (having a melt index of 7 and a density of 0.92) is melt-extruded from an extruder provided with a nozzle 5 mm in diameter and having a diameter of 40 mm and the molten extrudate is cut at the top end portion of the nozzle by a cutting blade so that about 300 mg of the melt is charged inside each crown shell. Immediately, punching is conducted by a cooled punch to form crown closures (having a size of type 5 specified by JIS S-9017; inner diameter=26.6 mm). Bottles filled with carbonated drink (inner pressure being 3 kg/cm² at 20° C.) are sealed with these crown closures. The bottles are stored at a temperature of 50° C. and a relative humidity of 100% for 3 months. Problems such as leakage of gas (reduction of the inner pressure) and rusting do not occur, thereby confirming the great practical utility of these closures.

The foregoing examples are intended to illustrate the present invention and its advantages. It will be understood, of course, that changes and variations can be made therein without departing from the scope of the invention as defined in the following claims.

We claim:

1. A polyolefin-metal bonded structure comprising a metal substrate and a polyolefin resin layer bonded to the metal substrate through a primer layer, said primer layer comprising:
   (a) a polar group-containing ethylenically unsaturated monomer-modified olefin resin (A) containing said polar groups at a concentration of between about 0.01 and 200 milliequivalents per 100 g of the olefin resin and having a degree of crystallinity of at least about 50%; and
   (b) a coating film-forming base resin (B) at an (A)/(B) weight ratio of between about 0.2/99.8 and 40/60, said primer layer having a multi-layer distribution structure with concentration gradients of components (A) and (B) in the thickness direction such that the base resin (B) is distributed predominantly in the portion of the primer layer contiguous to the surface of the metal substrate and the modified olefin resin (A) is distributed predominantly in the portion of the primer layer contiguous to the polyolefin layer, wherein when said primer layer is divided into three sub-layers with respect to the thickness direction, the distribution ratio, Dx, defined by the following formula:

$$D_x = 10000 \ W_X/(W)(C_A)$$

wherein W is the weight of the primer layer per unit surface area (mg/dm²), $C_A$ is the average % by weight of the modified olefin resin in the primer layer, and $W_X$ is the weight per unit area (mg/dm²) of the modified olefin resin in each sub-layer, being at least about 50% in the sub-layer, $L_S$, contiguous to the polyolefin layer and not higher than about 10% in the sub-layer, $L_B$, contiguous to the surface of the metal substrate.

2. A bonded structure according to claim 1 wherein the modified olefin resin is an olefin resin grafted with an ethylenically unsaturated carboxylic acid or ethylenically unsaturated carboxylic anhydride.

3. A bonded structure according to claim 1 wherein the distribution ratio in the sub-layer, $L_S$, is at least about 70% and the distribution ratio in the sub-layer, $L_B$, is not higher than about 5%.

4. A bonded structure according to claim 1 wherein the base resin has a density 10 percent greater than the density of the modified olefin resin and contains hydroxyl functional groups and carboxyl functional groups at a concentration of at least 1 milliequivalent per gram of base resin.

5. A bonded structure according to claim 1 wherein the base resin is selected from the group consisting of phenolic resin-epoxy resin paints, urea resin-epoxy resin paints, melamine resin-epoxy resin paints and phenolic resin-epoxy resin-vinyl resin paints.

6. A bonded structure according to claim 1 wherein the modified olefin resin is applied to the metal substrate in an amount coated of between about 0.1 and 10 mg/dm² and the base resin is applied to the metal substrate in an amount coated of between about 10 and 100 mg/dm².

7. A bonded structure according to claim 1 wherein wherein a modified polyethylene-free undercoat layer composed of a resin selected from the group consisting of phenol-epoxy-vinyl resins is formed in an amount of between about 10 and 200 mg/dm² between said primer layer and said metal substrate.

8. A bonded structure according to claim 1 wherein said structure is in the form of a vessel closure.

9. A bonded structure according to claim 1 wherein the metal substrate is a crown shell or cap shell, the polyolefin layer is a packing and the entire structure is in the form of a vessel closure.

10. A process for preparing a polyolefin-metal bonded structure, comprising applying an undercoat paint onto a metal substrate and fusion-bonding a polyolefin layer to the metal substrate through a layer of the undercoat paint, wherein said undercoat paint comprises:
(a) a polar group-containing ethylenically unsaturated monomer-modified olefin resin (A) containing said polar groups at a concentration of between about 0.01 and 200 milliequivalents per 100 g of the olefin resin and having a degree of crystallinity of at least about 50%; and
(b) a coating film-forming base resin (B) at an (A)/(B) weight ratio of between about 0.2/99.8 and 40/60 in a mixed solvent containing at least 70% by weight of a solvent component having a solubility parameter of between about 8.5 and 9.5, said mixed solvent being further characterized in that the difference between the boiling point of the highest boiling solvent component is at least about 20° C.

11. A process according to claim 10 wherein the modified olefin resin is an olefin resin grafted with an ethylenically unsaturated carboxylic acid or ethylenically unsaturated carboxylic anhydride.

12. A process according to claim 10 wherein the base resin has a density 10 percent greater than the density of the modified olefin resin and contains hydroxyl functional groups and carboxyl functional groups at a concentration of at least 1 milliequivalent of said functional groups per gram of base resin.

13. A process according to claim 10 wherein the base resin is selected from the group consisting of phenolic resin-epoxy resin paints, urea resin-epoxy resin paints, melamine resin-epoxy resin paints and phenolic resin-epoxy resin-vinyl resin paints.

14. A process according to claim 10 wherein the modified olefin resin is applied to the metal substrate in an amounted coated of between about 0.1 and 10 mg/dm² and the base resin is applied to the metal substrate in an amount coated of between about 10 and 100 mg/dm².

15. A process according to claim 10 wherein wherein a modified polyethylene-free undercoat layer composed of a resin selected from the group consisting of phenol-epoxy-vinyl resins is coated in an amount of between about 10 and 200 mg/dm² between said primer layer and said metal substrate.

16. A process according to claim 10 wherein said structure is in the form of a vessel closure.

17. A process according to claim 10 wherein the metal substrate is a crown shell or cap shell, the polyolefin layer is a packing and the entire structure is in the form of a vessel closure.

* * * * *

UNITED STATES PATENT AND TRADEMARK OFFICE
CERTIFICATE OF CORRECTION

PATENT NO. : 4,232,086

DATED : November 4, 1980

INVENTOR(S) : Fumio Mori, Isao Ichinose & Go Kunimoto

It is certified that error appears in the above-identified patent and that said Letters Patent are hereby corrected as shown below:

Cover page, left-hand column, under "[30] FOREIGN APPLICATION PRIORITY DATA", "Nov. 12, 1977 [JP] Japan......52137259" should read -- Nov. 17, 1977 [JP] Japan......52-137239 --.

Signed and Sealed this

Second Day of November 1982

[SEAL]

Attest:

GERALD J. MOSSINGHOFF

Attesting Officer     Commissioner of Patents and Trademarks